April 26, 1966 R. M. WOODWARD ETAL 3,248,190
LAMELLAR STRUCTURE
Filed May 6, 1963
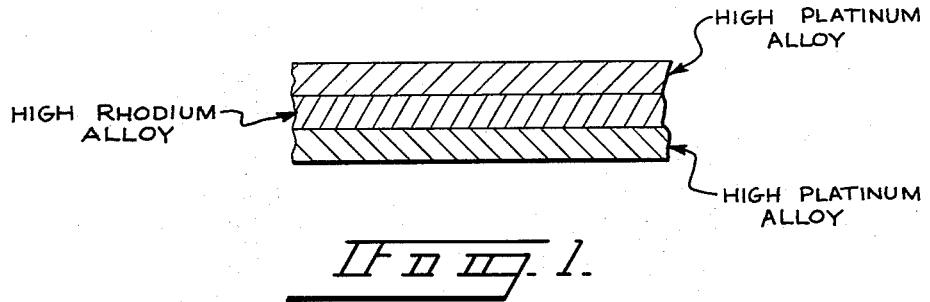
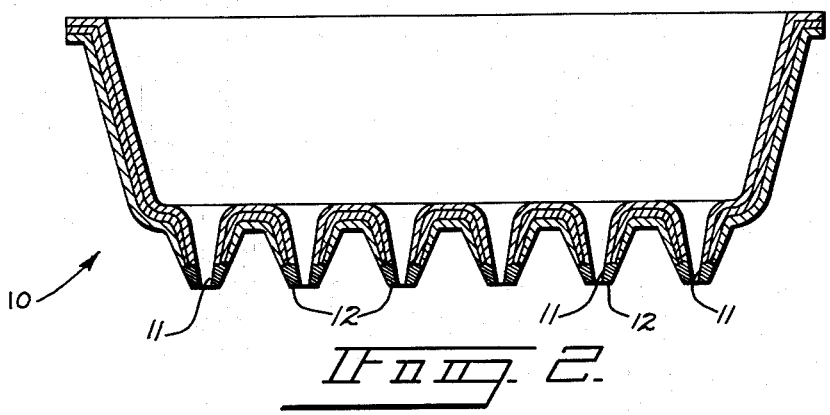
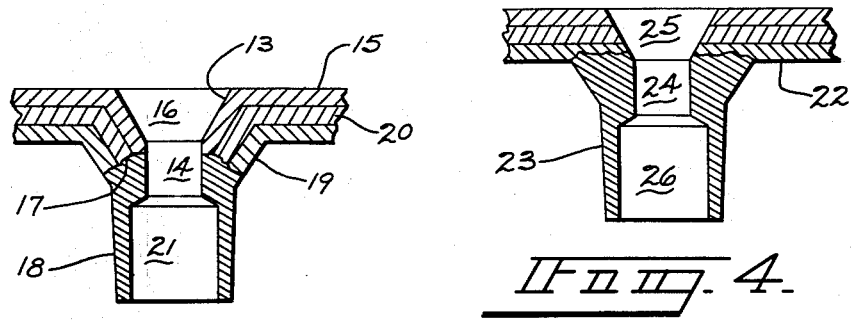
INVENTORS
ROBERT M. WOODWARD
EDWARD L. SATTERFIELD
BY
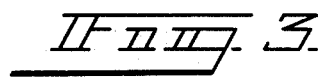
ATTORNEYS United States Patent Office 3,248,190
Patented Apr. 26, 1966

3,248,190
LAMELLAR STRUCTURE
Robert M. Woodward and Edward L. Satterfield, Newark, Ohio, assignors to Owens-Corning Fiberglas Corporation, a corporation of Delaware
Filed May 6, 1963, Ser. No. 278,320
6 Claims. (Cl. 65—1)

The present invention relates to metal laminates; and, more particularly, to improved laminates of precious metals having high strength and resistance to deformation at elevated temperatures.

Glass fibers are made by means of furnaces having orifice plates in their bottoms through which molten streams of glass are drawn and later attenuated into fibers. The flow of small streams of molten glass through the orifice plate is extremely corrosive and erosive of the orifice plate, and these plates have customarily been made from platinum to withstand the corrosive and erosive conditions. Such orifice plates are commonly called bushings or feeders by the art.

An object of the invention is the provision of a new and improved platinum alloy laminate having high strength and resistance to deformation at elevated temperatures.

A further object of the invention is the provision of a new and improved orifice plate for glass furnaces and the like through which glass streams are drawn in the production of fibers, and which orifice plate has improved strength and resistance to deformation at the elevated operating temperatures at which the furnace operates.

The invention resides in certain constructions, combinations, and arrangements, of materials; and further objects and advantages thereof will become apparent to those skilled in the art to which it relates from the following description of several preferred embodiments described with reference to the accompanying drawings forming a part of this specification, and in which:

FIG. 1 is a fragmentary cross sectional view of a metal laminate according to the invention;

FIG. 2 is a view in cross section of an orifice plate according to the invention for a glass furnace;

FIG. 3 is a fragmentary sectional view through one orifice, showing details of its fabrication, of an orifice plate of a type somewhat different from that shown in FIG. 2; and FIG. 4 is a fragmentary sectional view through one orifice, showing details of its fabrication, of a further modified orifice plate.

The orifice plates or bushings which are provided at the bottom of glass furnaces, and through the orifices of which molten glass is drawn in forming glass fibers, are usually made of a high platinum alloy, such as one of 90 percent[1] platinum, 10 percent rhodium. Molten glasses are particularly corrosive or erosive to most metals at the operating temperatures of the furnace, and platinum has proved to be one of the best materials for this service. One of the difficulties of orifice plates made of high platinum alloys, however, is that they slowly deform during use, and this deformation continues until such time as either a crack is produced, or the plate bows to such an extent that the orifice openings extend at such widely varied angles that the orifice plate can no longer be used.

A precious metal laminate which has been found in experimental use to be a substantially improved structural material for an orifice plate of a glass melting furnace is provided according to the invention. The laminate comprises at least one layer of an alloy high in rhodium and, bonded thereto, at least one layer of an alloy high in platinum. In use, one major surface of the high rhodi-

[1] The terms "percent" and "parts" are used herein, and in the appended claims, to refer to percent and parts by weight, unless otherwise indicated.

um layer of an orifice plate or bushing made from such a laminate must be bonded to a high platinum layer, and the other major surface thereof must be in direct contact with molten glass or also bonded to a high platinum layer. Preferably, the laminate comprises a center layer of an ally high in rhodium and sandwiched between and bonded to two outer layers, each of which is a platinum-rhodium alloy that is high in platinum. The outer layers should preferably consist essentially of between 75 and 90 percent platinum and 10 and 25 percent rhodium. The center layer preferably consists essentially of between 75 and 100 percent rhodium, and 0 and 25 percent platinum, and more desirably should consist essentially of between 90 and 95 percent rhodium and 10 and 5 percent platinum. The laminate can include additional layers, but preferably, each high rhodium layer is sandwiched between, and bonded to, two high platinum layers.

A metal laminate according to the invention can be made by rolling alloy sheets of the above designated compositions to their approximate desired thicknesses, degreasing these sheets with a suitable solvent such as trichlor ethylene, carbon tetrachloride, etc., pickling the degreased sheets with aqua regia, and then rolling the pickled sheets together in the sandwiched structure at approximately 2200° F. When hot rolled at such a temperature after degreasing and cleaning in the above described manner, the three layers bond or weld together into a laminated structure. Such a structure can be formed into an orifice plate for a fiber-forming glass melting furnace, e.g., the orifice plate indicated generally at 10 in FIG. 2.

The orifice plate 10 of FIG. 2 is formed by heating the laminate, sometimes called a clad material, to a temperature of approximately 2200° F., and pressing the plate downwardly to form dimples at the locations where orifice openings 11 are desired. Thereafter the dimples are pierced to provide the openings—following which the openings are built up with the platinum weld material as shown for example at 12. In one embodiment of the orifice plate which was tested, the laminate had a total thickness of forty thousandths of an inch with a center section of approximately nine thousandths of an inch thick. The center section was 95 percent rhodium, 5 percent platinum, and the two outside layers had a composition of 90 percent platinum and 10 percent rhodium. The orifice plate made from the laminate had a service life, in a glass furnace, approximately twice as long as another orifice plate forty thousandths inch thick, and identical therewith except that it was made from a 90 percent platinum and 10 percent rhodium alloy sheet. Another particularly desirable laminate can be produced as described above from a center layer consisting essentially of 95 percent of rhodium and 5 percent of platinum, and outer layers consisting essentially of 75 percent platinum and 25 percent of rhodium. Other suitable laminates having excellent properties can be made by the method described above from center layers consisting essentially of from 75 to 100 percent of rhodium and from 0 to 25 percent of platinum and outside layers consisting essentially of from 60 to 100 percent of platinum and from 0 to 40 percent of rhodium. It will be understood that minor percentages of certain impurities can be present in all of the foregoing alloys without harmful effects.

Rhodium alloys are more resistant to continuing forces tending to cause deformation at elevated temperatures than platinum alloys. However, rhodium exhibits an affinity for oxygen under these conditions and considerable metal loss occurs in air, by volatilization, and the structure weakens. The outside layers consisting of 60 to 100 percent platinum prevent this and also contribute to ease of fabrication.

FIGURE 3 of the drawing is a fragmentary view showing the details of construction of an orifice plate or bushing which is somewhat different than the plate 10. In the construction shown in FIG. 3, a laminate of the type shown in FIG. 1 is pierced and deformed downwardly as at 13 at the location where an orifice 14 is to be made. By so doing, all three layers are deformed, so that a top high platinum alloy layer 15 forms the wall surrounding the tapered entrant portion 16 of the orifice 14. High platinum alloy is welded to an annular edge 17 that is formed by the piercing operation to form an annular boss 18. The weld metal forming the boss 18 bridges the top layer 15 with the bottom layer 19 of the laminate to seal off the center high rhodium alloy layer 20 thereof from the glass flowing through the orifice 14. The boss 18 is drilled out to provide the desired size of orifice 14, and the bottom end of the orifice 14 is counterbored as at 21 to shorten the length of the orifice 14 and provide a shield for the molten glass filament as it leaves the orifice.

The orifice of the bushing shown in FIG. 4 is made by depositing high platinum weld metal to the bottom layer 22 of a laminate of the type shown in FIG. 1 to form an annular boss 23. An opening 24 is drilled through the boss 23 to form the desired size of orifice. The upper end of the opening 24 is beveled as at 25 to provide a tapered entrant portion, and the bottom end of opening 24 is counterbored as at 26 to shorten the length of the orifice 24 and provide a shield for the molten glass filament as it leaves the orifice.

It is apparent that the objects heretofore enumerated as well as others have been accomplished and that a laminate having at least one high platinum layer bonded to a high rhodium layer, and which has improved strength at elevated temperatures over appreciable lengths of time, has been provided.

While the invention has been described in considerable detail, it is not to be limited to the particular embodiments shown and described, and it is intended to cover hereby all novel adaptations, modifications and arrangements thereof which come within the practice of those skilled in the art to which the invention relates.

What we claim is:

1. A metal laminate having high corrosion resistance and strength, and comprising: a center layer of metal consisting essentially of from approximately 75 percent to approximately 100 percent of rhodium and from approximately 25 percent to approximately 0 percent of platinum, sandwiched between, and bonded to, each of two, spaced, opposed layers of metal consisting essentially of from approximately 60 percent to approximately 100 percent of platinum and from approximately 40 percent to approximately 0 percent of rhodium.

2. A metal laminate having high corrosion resistance and strength, and comprising: a center layer of metal consisting essentially of from approximately 90 percent to approximately 95 percent of rhodium, and from approximately 10 percent to approximately 5 percent of platinum, sandwiched between, and bonded to, each of two, spaced, opposed layers of metal consisting essentially of from approximately 75 percent to approximately 90 percent of platinum and from approximately 25 percent to approximately 10 percent of rhodium.

3. A metal laminate having high corrosion resistance and strength, and comprising: a center layer of metal consisting essentially of approximately 95 percent of rhodium and approximately 5 percent of platinum, sandwiched between, and bonded to, each of two, spaced, opposed layers of metal consisting essentially of approximately 90 percent of platinum and 10 percent of rhodium.

4. A metal laminate having high corrosion resistance and strength, and comprising: a center layer of metal consisting essentially of approximately 95 percent of rhodium and approximately 5 percent of platinum, sandwiched between, and bonded to, each of two, spaced, opposed layers of metal consisting essentially of approximately 75 percent of platinum and 25 percent of rhodium.

5. A bushing for producing glass fibers comprising a metal laminate having a center layer of metal consisting essentially of from approximately 90 percent to approximately 95 percent of rhodium, and from approximately 10 percent to approximately 5 percent of platinum, sandwiched between and bonded to, each of two, spaced, opposed layers of metal consisting essentially of from approximately 75 percent to approximately 90 percent of platinum and from approximately 25 percent to approximately 10 percent of rhodium, said laminate having openings therethrough the sidewalls of which are lined with the material of said spaced opposed layers for the flow of glass in the production of fibers.

6. A bushing for producing glass fibers comprising a metal laminate having a first layer of metal consisting essentially of from approximately 90 percent to approximately 95 percent of rhodium, and from approximately 10 percent to approximately 5 percent of platinum, said first layer having a major surface adjacent to the molten glass in the bushing, and being bonded to an opposed second layer of metal consisting essentially of from approximately 75 percent to approximately 90 percent of platinum and from approximately 25 percent to approximately 10 percent of rhodium, said second layer having a major surface spaced by said first layer from molten glass in the bushing and a major surface in contact with air when the bushing is in use, said laminate having openings therethrough for the flow of glass in the production of fibers.

References Cited by the Examiner

UNITED STATES PATENTS

| 2,031,083 | 2/1936 | Weller | 75—172 |
| 2,106,527 | 1/1938 | Hostetter | 65—374 |
| 2,460,547 | 2/1949 | Stevens | 75—172 |
| 2,803,925 | 8/1957 | Klausmann | 75—172 |

HOWARD R. CAINE, *Acting Primary Examiner.*

DONALL H. SYLVESTER, *Examiner.*